United States Patent
Berrier et al.

(10) Patent No.: US 7,504,158 B2
(45) Date of Patent: Mar. 17, 2009

(54) DUAL-OVENABLE, HEAT-SEALABLE PACKAGING FILM

(75) Inventors: Arthur Leroy Berrier, Simpsonville, SC (US); Cynthia Louise Ebner, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 347 days.

(21) Appl. No.: 11/273,768

(22) Filed: Nov. 14, 2005

(65) Prior Publication Data
US 2006/0088678 A1     Apr. 27, 2006

Related U.S. Application Data

(62) Division of application No. 10/228,515, filed on Aug. 27, 2002, now Pat. No. 6,979,494.

(51) Int. Cl.
*B32B 27/06* (2006.01)
*B32B 27/34* (2006.01)

(52) U.S. Cl. .............. 428/474.9; 428/474.4; 428/474.7; 428/35.7; 428/220; 428/36.6; 428/36.7; 426/113; 426/114; 426/415; 426/115; 426/412

(58) Field of Classification Search .............. 428/474.4, 428/474.7, 474.9, 475.5, 475.8, 35.7, 35.2, 428/36.6, 36.7, 34.8, 34.9, 220; 426/114, 426/113, 115, 410, 412, 415, 407
See application file for complete search history.

(56) References Cited

U.S. PATENT DOCUMENTS 3,369,911 A    2/1968    Von Witzleben (Continued)

FOREIGN PATENT DOCUMENTS

DE    199 35 324    1/2001

(Continued)

*Primary Examiner*—Michael C Miggins
(74) *Attorney, Agent, or Firm*—Daniel B. Ruble

(57) ABSTRACT

A dual ovenable film having a first layer comprising one or more polyamides and a second layer comprising one or more polyamides. The first layer forms the first outer surface of the film. The second layer has a melting point of at least about 210° C. The film is capable of forming a water-containing package by providing two 4 inch by 6 inch sheets of the film each having four perimeter sides, placing the sheets in superimposed, coextensive arrangement having the first layers of the films in contact with each other, and heat sealing three perimeter sides of the sheets together using a ⅛-inch wide sealing bar at a temperature of 290° F., a dwell time of 0.5 seconds, and a sealing pressure of 40 psig to form an open pouch having heat seals along three of the four perimeter sides. The open pouch can be filled with 100 milliliters of distilled water at a temperature of 73° F. and the fourth perimeter side of the sheet can be heat sealed together under the same conditions as used to seal the three perimeter sides to form a closed package having a heat seal along the fourth perimeter side and containing the water. The seal strength of the resulting heat seals is at least 1 pound/inch after the closed, water-containing package has been exposed to three hours in a conventional oven at 400° F. (air temperature). The film may be used to form heat sealed pouches at "polyolefin-type" of heat seal conditions, yet the integrity of the heat seals may be maintained even when the heat seal is exposed to conventional oven conditions.

60 Claims, 3 Drawing Sheets

U.S. PATENT DOCUMENTS

| | | | |
|---|---|---|---|
| 3,762,986 A | 10/1973 | Bhuta et al. |
| 3,995,084 A | 11/1976 | Berger et al. |
| 4,355,721 A | 10/1982 | Knott, II et al. |
| 4,400,429 A | 8/1983 | Barlow et al. |
| 4,421,823 A | 12/1983 | Theisen et al. |
| 4,448,792 A | 5/1984 | Schirmer |
| 4,495,249 A | 1/1985 | Ohya et al. |
| 4,537,305 A | 8/1985 | Takanashi |
| 4,542,075 A | 9/1985 | Schirmer |
| 4,568,922 A | 2/1986 | Schwippert et al. |
| 4,605,460 A | 8/1986 | Schirmer |
| 4,606,922 A | 8/1986 | Schiemer |
| 4,647,483 A | 3/1987 | Tse et al. |
| 4,766,018 A | 8/1988 | Hinrichsen et al. |
| 4,803,122 A | 2/1989 | Schirmer |
| 4,855,103 A | 8/1989 | Ekbom |
| 4,855,183 A | 8/1989 | Oberle |
| 4,877,684 A | 10/1989 | Shepard et al. |
| 4,892,765 A | 1/1990 | Hisazumi et al. |
| 4,925,685 A | 5/1990 | Sahi |
| 4,935,272 A | 6/1990 | Leboeuf |
| 4,937,112 A | 6/1990 | Schirmer |
| 4,970,113 A | 11/1990 | Yamada |
| 5,016,735 A | 5/1991 | Hodge |
| 5,037,683 A | 8/1991 | Schirmer |
| 5,061,532 A | 10/1991 | Yamada |
| 5,089,073 A | 2/1992 | Schirmer |
| 5,185,189 A | 2/1993 | Stenger et al. |
| 5,206,309 A | 4/1993 | Altman |
| 5,281,360 A | 1/1994 | Hong et al. |
| 5,314,987 A | 5/1994 | Kim et al. |
| 5,374,459 A | 12/1994 | Mumpower et al. |
| 5,460,878 A | 10/1995 | Hostetter |
| 5,462,756 A | 10/1995 | Raines et al. |
| 5,480,690 A | 1/1996 | Stenger et al. |
| 5,547,765 A | 8/1996 | Degrassi et al. |
| 5,866,649 A | 2/1999 | Hong et al. |
| 5,926,989 A | 7/1999 | Oliver, Sr. |
| 6,110,600 A | 8/2000 | Ramesh |
| 6,221,410 B1 | 4/2001 | Ramesh et al. |
| 6,239,210 B1 | 5/2001 | Kim et al. |
| 6,288,161 B1 | 9/2001 | Kim et al. |
| 6,346,285 B1 | 2/2002 | Ramesh |
| 6,416,832 B1 | 7/2002 | Uehara et al. |
| 6,436,547 B1 | 8/2002 | Toft et al. |
| 6,627,324 B1 | 9/2003 | Eggers et al. |
| 2002/0001684 A1 | 1/2002 | Kim et al. |
| 2003/0134966 A1 | 7/2003 | Kim et al. |

FOREIGN PATENT DOCUMENTS

| | | |
|---|---|---|
| EP | 0 229 527 A2 | 7/1987 |
| EP | 0 366 382 A1 | 10/1988 |
| EP | 0 315 409 A2 | 5/1989 |
| EP | 0 338 488 B1 | 10/1989 |
| EP | 0 231 663 B1 | 10/1990 |
| EP | 0 795 482 A1 | 9/1997 |
| EP | 0 960 903 A2 | 12/1999 |
| EP | 1 172 202 A1 | 1/2002 |
| WO | 92/15641 | 9/1992 |
| WO | 93/01108 | 1/1993 |
| WO | 97/04959 | 2/1997 |
| WO | 97/12758 | 4/1997 |
| WO | 97/28047 | 8/1997 |
| WO | 98/06574 A | 2/1998 |
| WO | 99/33653 | 7/1999 |
| WO | 01/89830 A1 | 11/2001 |
| WO | 02/072347 A2 | 9/2002 |

DUAL-OVENABLE, HEAT-SEALABLE PACKAGING FILM

This application is a divisional application under 35 U.S.C. §§ 120-121 of pending prior U.S. patent application Ser. No. 10/228,515 filed Aug. 27, 2002 by Berrier et al for "Dual Ovenable, Heat-Sealable Packaging Film" (parent application) now U.S. Pat. No. 6,979,494, which is incorporated herein in its entirety by reference.

BACKGROUND OF THE INVENTION

The present invention relates to multilayer packaging films, for example, useful in applications requiring a high degree of dimensional stability at elevated oven temperatures, and more particularly to dual-ovenable, heat-sealable packaging films.

For the convenience of consumers, packaged food may be designed to be placed directly in a microwave or conventional oven to heat or cook the food without first removing the packaging. The consumer thus avoids having to handle the raw product or to clean a container in which the food would have otherwise been placed for cooking or heating. The consumer may also simply dispose of the packaging material after heating or cooking the food.

Packaging that can withstand exposure to the heating and/or cooking environment of a selected type of oven is said to be "ovenable" with respect to that type of oven. To be ovenable with respect to a microwave oven, the packaging should not, for example, include materials such as metals that reflect microwaves to cause arcing or otherwise damage the oven's microwave generation. To be ovenable with respect to a conventional oven, the packaging should, for example, be able in use to withstand exposure to 400° F. air temperature for up to four hours. Packaging that is ovenable both with respect to a microwave oven and a conventional oven is said to be "dual-ovenable."

Food packaging may be formed by heat sealing thermoplastic film to itself to form a pouch or similar article containing the food. This heat sealing operation typically occurs at the food packager's plant using a heat sealing machine designed for high speed operation. Although there are several variations, generally a heat sealing machine includes a heated seal bar that contacts and compresses the two films to be heat sealed together. Three variables are important in forming a heat seal: 1) the seal bar temperature, 2) the dwell time, and 3) the sealing pressure. The seal bar temperature is the surface temperature of the seal bar. The dwell time is the length of time that the heated seal bar contacts the film to transfer heat from the seal bar to soften at least a portion of the films (e.g., the sealing layers of the films) so that they may be melded together. The sealing pressure is the amount of force that squeezes the films together during this heat transfer. All of these variables interact in completing a successful heat seal.

Because the heat sealing layers for much of the thermoplastic packaging films used in food packaging are based on relatively low-melting polyolefin thermoplastics (or similar melt-temperature thermoplastics), the heat sealing machines present in food packaging plants are often designed and set to operate with a seal bar temperature, a dwell time, and a sealing pressure in a range useful for such materials. This permits the heat sealing machines to operate at high speeds to form strong seals. Such a heat sealing machine may operate at, for example, a seal bar temperature of 290° F., a dwell time of 0.5 seconds, and a sealing pressure of 40 psig.

An existing ovenable packaging material for conventional ovens is a monolayer film based on a blend of nylon 6 with nylon 6,6. However, this film requires a relatively high sealing temperature to effect a useful heat seal. For example, at a sealing pressure of 40 psig and a dwell time of 0.5 seconds, the sealing bar temperature is generally at least about 380° F. Because typical existing heat sealing machines in food packaging plants cannot easily accommodate operation at those conditions, rather than forming a heat seal, a metal clip is typically used to close food-packaging based on this film, in which case the resulting food packaging is not dual ovenable. Further, a metal clip is an expensive closure method compared to heat sealing—and limits the use of X-ray examination to check packages for metallic contaminants.

The addition of a heat seal layer of relatively low-melting polyolefin thermoplastic to the existing monolayer film of a blend of nylon 6 and nylon-6,6 would result in a two-layer film that is heat sealable at the "polyolefin-type" of heat sealing conditions discussed above; however, such a film would not be able to form heat seals that are ovenable in conventional ovens because the relatively low-melting polyolefin layer would melt, decompose, or delaminate from the nylon layer upon exposure to a 400° F. conventional oven for three hours.

SUMMARY OF THE INVENTION

The present invention addresses one or more of the aforementioned problems. In one embodiment, a film comprises a first layer comprising one or more polyamides and a second layer comprising one or more polyamides. The second layer has a melting point of at least about 210° C. The first layer forms the first outer surface of the film.

The film may be capable of forming a water-containing package by providing two 4 inch by 6 inch sheets of the film each having four perimeter sides, placing the sheets in superimposed, coextensive arrangement having the first layers of the films in contact with each other, and heat sealing three perimeter sides of the sheets together using a ⅛-inch wide sealing bar at a temperature of 290° F., a dwell time of 0.5 seconds, and a sealing pressure of 40 psig to form an open pouch having heat seals along three of the four perimeter sides. The open pouch can be filled with 100 milliliters of distilled water at a temperature of 73° F. and the fourth perimeter side of the sheet can be heat sealed together under the same conditions as used to seal the three perimeter sides to form a closed package having a heat seal along the fourth perimeter side and containing the water. The seal strength of the resulting heat seals may be at least 1 pound/inch after the closed, water-containing package has been exposed to three hours in a conventional oven at 400° F. (air temperature ).

It was unexpected that the integrity of a heat seal formed by a film at "polyolefin-type" of heat seal conditions would be maintained where the heat seal was exposed to conventional oven conditions.

These and other objects, advantages, and features of the invention will be more readily understood and appreciated by reference to the detailed description of the invention and the drawings.

DETAILED DESCRIPTION OF THE INVENTION

Figure 2:
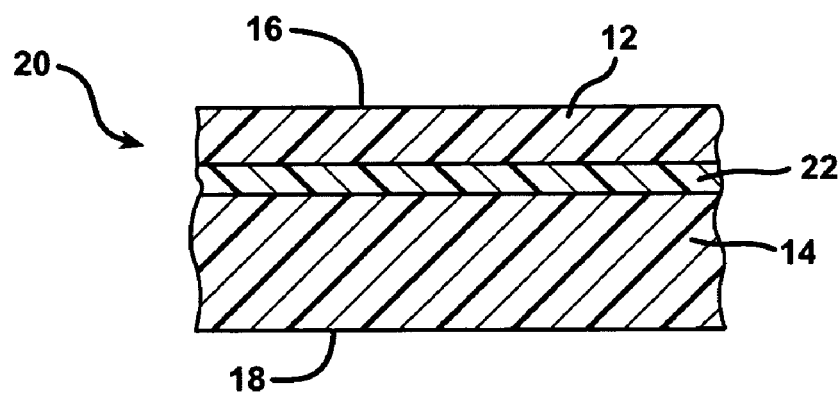
FIG. 2 is a representational cross-section of a film of the present invention having at least three layers.
Figure 3:
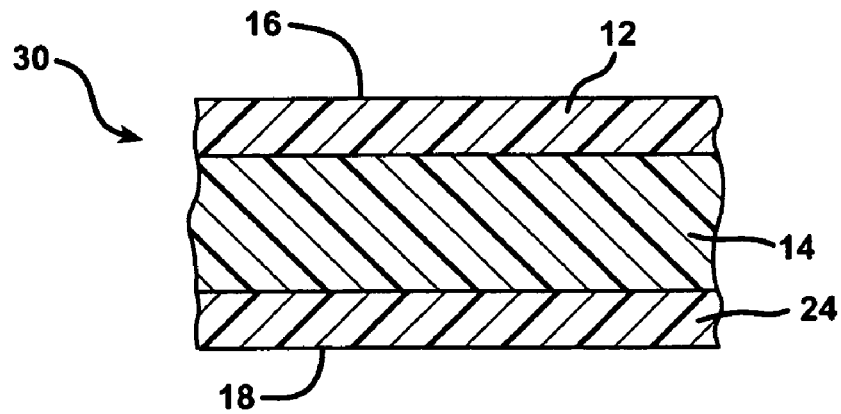
FIG. 3 is a representational cross-section of another film of the present invention having at least three layers.

The film of the present invention includes at least two layers: first layer 12 and second layer 14. For two-layer film 10 (FIG. 1), first layer 12 forms the first outer surface 16 of the film and second layer 14 forms the second outer surface 18 of film 10 opposite outer surface 16. For a film comprising three or more layers, both the first and second layers 12, 14 may be outer layers forming the outside surfaces of the film 20 (FIG. 2) with one or more additional layers 22 between the first and second layers —or the second layer 14 may form an interior layer of film as shown by film 30 (FIG. 3) with one or more additional layers 24 oriented to the exterior of second layer 14. For a film comprising four or more layers, the second layer 14 may form an interior layer of film as shown by film 40 (FIG. 4) with one or more additional layers 22 between the first and second layers and with one or more additional layers 24 oriented to the exterior of second layer 14.

The film of the present invention may comprise, for example, at least 3 layers, at least 4 layers, at least 5 layers, from 2 to 4 layers, from 2 to 5 layers, and from 5 to 9 layers. As used herein, the term "layer" refers to a discrete film component which is coextensive with the film and has a substantially uniform composition. Where two or more adjacent layers have essentially the same composition, then these two or more adjacent layers may be considered a single layer for the purposes of this application.

Figure 1:
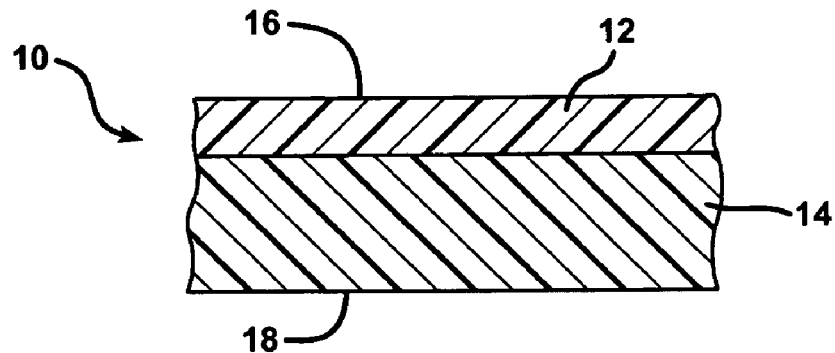
FIG. 1 is a representational cross-section of a two-layer film of the present invention.
Figure 4:
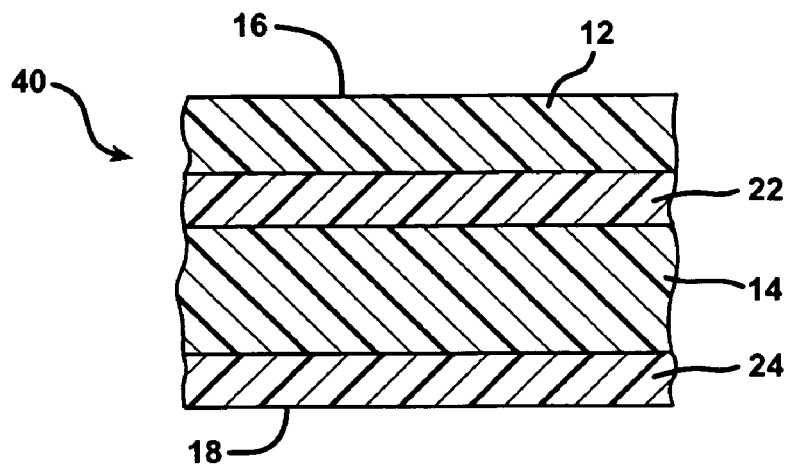
FIG. 4 is a representational cross-section of a film of the present invention having at least four layers.
Figure 5:
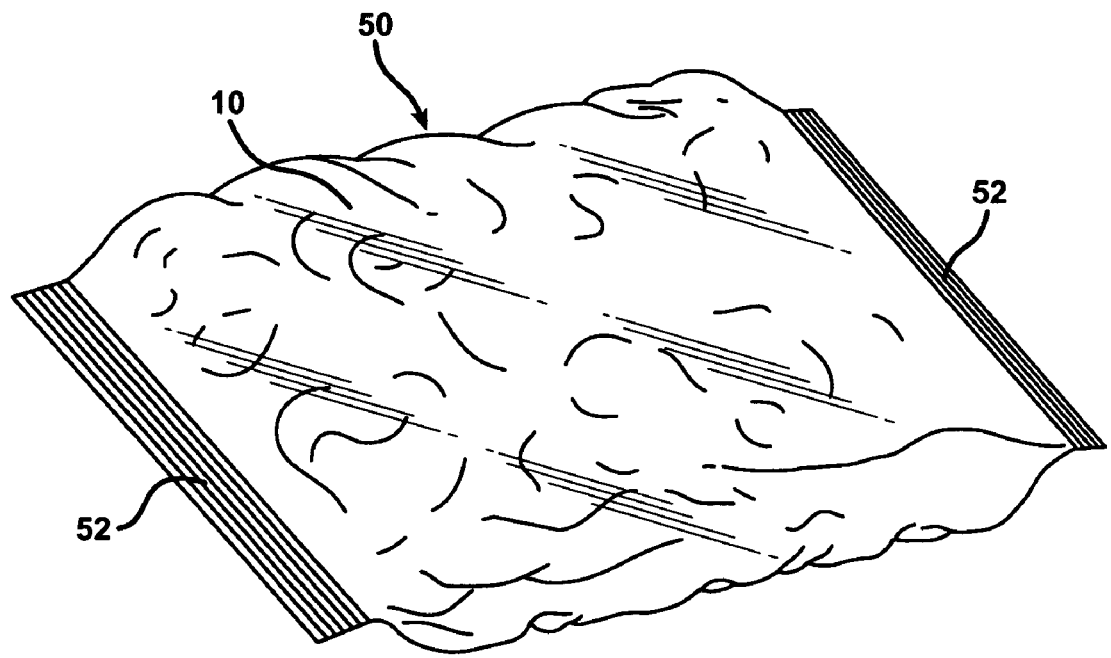
FIG. 5 is a perspective view of a pouch comprising the film of the present invention.

The film 10 (or any film of the present invention) may be formed into a bag or pouch 50 (FIG. 5), for example, one suitable for packaging a food product. In forming such a bag, the first layer 12 may be sealed to itself to form the heat seal seams 52 of the bag. In this manner, the first layer 12 (i.e., the "heat seal layer" or "sealant layer") of the film is considered the "inside" or food-side layer of the film and the bag made from the film. The "outside layer" of the film may be second layer 14 (as shown in FIG. 1) or the outside layer may formed by one of the one or more layers 24 (as shown in FIG. 4).

First Layer of the Film

The first layer 12 facilitates heat sealing the film to itself or to another object, such as a support member or tray, and accordingly may be considered the sealant layer.

The sealant layer comprises one or more polyamides. Useful polyamides may include those of the type that may be formed by the polycondensation of one or more diamines with one or more diacids and/or of the type that may be formed by the polycondensation of one or more amino acids. Useful polyamides include aliphatic polyamides and aliphatic/aromatic polyamides.

Representative aliphatic diamines for making polyamides include those having the formula:

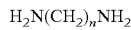

where n has an integer value of 1 to 16. Representative examples include trimethylenediamine, tetramethylenediamine, pentamethylenediamine, hexamethylenediamine, octamethylenediamine, decamethylenediamine, dodecamethylenediamine, hexadecamethylenediamine. Representative aromatic diamines include p-phenylenediamine, 4,4'-diaminodiphenyl ether, 4,4' diaminodiphenyl sulphone, 4,4'-diaminodiphenylethane. Representative alkylated diamines include 2,2-dimethylpentamethylenediamine, 2,2,4-trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

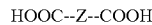

where Z is representative of a divalent aliphatic radical containing at least 2 carbon atoms. Representative examples include adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid.

The polycondensation reaction product of one or more or the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6, 10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6, 12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4, I"), polyhexamethylene isophthalamide ("nylon-6,I"), poly(2,2,2-trimethyl hexamethylene terephthalamide), poly(m-xylylene adipamide) ("nylon-MXD,6"), poly(p-xylylene adipamide), poly(hexamethylene terephthalamide), poly(dodecamethylene terephthalamide), and polyamide-MXD,I.

Representative polyamides of the type that may be formed by the polycondensation of one or more amino acids include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly(10-aminodecanoic acid) ("nylon-10"), poly(11-aminoundecanoic acid) ("nylon-11"), and poly(12-aminododecanoic acid) ("nylon-12").

Representative copolyamides include copolymers based on a combination of the monomers used to make any of the foregoing polyamides, such as, nylon-4/6, nylon-6/6, nylon-6/9, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethylene-azelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6, T/6, I, nylon-6/MXD,T/MXD,I, nylon-6,6/6,10, and nylon-6, I/6, T.

Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyamide copolymers may include the most prevalent polymer unit in the copolymer (e.g., hexamethylene adipamide as a polymer unit in the copolymer nylon-6,6/6) in mole percentages ranging from any of the following: at least about 50%, at least about 60%, at least about 70%, at least about 80%, and at least about 90%, and the ranges between any of the forgoing values (e.g., from about 60 to about 80%); and may include the second most prevalent polymer unit in the copolymer (e.g., caprolactam as a polymer unit in the copolymer nylon-6,6/6) in mole percentages ranging from any of the following: less than about 50%, less than about 40%, less than about 30%, less than about 20%, less than about 10%, and the ranges between any of the forgoing values (e.g., from about 20 to about 40%).

Useful polyamides include those that are approved by the controlling regulating agency (e.g., the U.S. Food and Drug Agency) for either direct contact with food and/or for use in a food packaging film, at the desired conditions of use.

The sealant layer may comprise one or more polyamides in an amount of any of the following ranges based on the weight of the sealant layer: at least about 70%, at least about 80%, at least about 90%, at least about 95%, at least about 96%, and at least about 98%. Further, the sealant layer may comprise about 100% polyamide, may consist of one or more polyamides, or may consist essentially of one or more polyamides.

The sealant layer may comprise more than one polyamide such as a blend of polyamides, for example, two polyamides, at least two polyamides, three polyamides, and at least three polyamides. The sealant layer may comprise a first polyamide in any of the following amounts (based on the weight of the sealant layer): at least about 40%, at least about 50%, at least about 60%, at least about 70%, at least about 80%, at least about 90%, at least about 95%, and the ranges between any of these forgoing values (e.g., from about 60 to about 80%).

The sealant layer may comprise a second polyamide in any of the following amounts (based on the weight of the sealant layer): less than about 60%, less than about 50%, less than about 40%, less than about 30%, less than about 20%, less than about 10%, and less than about 5%, and the ranges between any of these forgoing values (e.g., from about 20 to about 40%).

The sealant layer may comprise a third polyamide in any of the following amounts (based on the weight of the sealant layer): less than about 60%, less than about 50%, less than about 40%, less than about 30%, less than about 20%, less than about 10%, and less than about 5%, and the ranges between any of these forgoing values (e.g., from about 20 to about 40%).

Each of the first, second, and third polyamides of the sealant layer may be selected from any of the polyamides described above, for example, nylon-6, nylon-6,6, nylon-6,12, nylon-6,6/6,10, and nylon-6,I/6, T. The sealant layer may comprise at least one of nylon-6 and nylon-6,6. The sealant layer may comprise, for example, any of the following combinations: nylon-6 and nylon-6,6/6,10; nylon-6 and nylon-6,I/6, T; nylon-6,6 and nylon-6,12; nylon-6, nylon-6,6/6,10, and nylon-6,I/6, T; and nylon-6, nylon-6,12, and nylon-6,I/6, T.

To facilitate heat sealing at polyolefin-type sealing conditions (as discussed in the Background section) the sealant layer 12 may have a softening characteristic such that two representative samples of the film that are heat sealed together (with the sealant layers of the films facing each other)—using a ⅛-inch wide sealing bar at a temperature selected from 290° F. and 300° F., a dwell time of 0.5 seconds, and a sealing pressure of 40 psig—forms a heat seal having a seal strength (as discussed below) of at least about any of the following: 1 pound/inch, 2 pound/inch, 2.5 pound/inch, and 3 pounds/inch.

The sealant layer may have a melting point less than about any of the following values: 220° C., 210° C., 200° C., 190° C., and 180° C.; and the melting point of the sealant layer may be at least about any of the following values: 120° C., 130° C., 140° C., and 150° C. All references to the melting point of a polymer, a resin, or a film layer in this application refer to the melting peak temperature of the dominant melting phase of the polymer, resin, or layer as determined by differential scanning calorimetry according to ASTM D-3418.

If the sealant layer comprises amorphous material, then the sealing layer may not clearly display a melting point. The glass transition temperature for the sealing layer may be less than about, and may range between about, any of the following values: 125° C., 120° C., 110° C., 100° C., 90° C., 80° C., 70° C., 60° C., and 50° C.; measured where the relative humidity may be any of the following values: 100%, 75%, 50%, 25%, and 0%. All references to the glass transition temperature of a polymer, a resin, or a film layer in this application refer to the characteristic temperature at which glassy or amorphous polymers become flexible as determined by differential scanning calorimetry (DSC) according to ASTM D-3417.

The sealant layer may comprise a polyamide blend comprising one or more relatively high-melting point polyamides with one or more relatively low-melting point polyamides. The sealant layer may comprise such a polyamide blend in at least about any of the following amounts based on the weight of the sealant layer: 70%, 80%, 90%, and 95%. The relatively high-melting point polyamides may have a melting point of at least about any of the following values: 210° C., 215° C., 220° C., 225 ° C., 230° C., 235° C., 240° C., 245° C., 250° C., 255° C., 260° C., 265° C., 270° C., 275° C., 280° C., 285° C., 290° C., 295° C., and 300° C.; and may range between any of the forgoing values (e.g., from about 235 to about 280° C.). Representative relatively high-melting point polyamides may include nylon-6, nylon-6,6, nylon-6/6,6, nylon-6,10, nylon-6,12, nylon-6/6, T, nylon-MXD,6, nylon-4,6, nylon-6,9, and nylon-6,6,/6,10 (having less than about 10% or more than about 60% nylon-6,6 in the copolymer).

The relatively low-melting point polyamides may have a melting point of less than about any of the following values: 210° C., 205° C., 200° C., 195° C., 190° C., 185° C., and 180° C. Representative relatively low-melting point polyamides may include nylon-6/12, nylon-12, nylon-12,T, nylon-6/6,9, nylon-11, and nylon-6,6,/6,10 (having from about 10% to about 60% nylon-6,6 in the copolymer).

The amount of relatively high-melting point polyamide in the polyamide blend of relatively high-melting point polyamide with relatively low-melting point polyamide may be at least about, may be less than about, and may range between about any of the following amounts (based on the weight of the blend): 1%, 5%, 10%, 10%, 20%, 30%, 40%, and 50%. The amount of relatively low-melting point polyamide in the blend of relatively high-melting point polyamide with relatively low-melting point polyamide may be at least about, may be less than about, and may range between about any of the following amounts (based on the weight of the blend): 50%, 60%, 70%, 80%, 90%, 95%, and 99%.

The sealant layer may comprise a polyamide blend comprising a first relatively high-melting point polyamide with a second relatively high-melting point polyamide. The sealant layer may comprise such a polyamide blend in at least about any of the following amounts based on the weight of the sealant layer: 70%, 80%, and 90%.

The sealant layer may comprise a blend of two or more polyamides where each polyamide of the blend has a melting point higher than the melting point of the blend, for example, where the melting point range for the blend includes any of the melting point ranges as set forth for the sealant layer above.

The sealant layer may comprise one or more amorphous polyamides, for example, nylon-6,I/6,T. The sealant layer may comprise amorphous polyamide in an amount at least about, at most about, and ranging between about any of the following values (based on the weight of the sealant layer): 20%, 30%, 40%, 50%, 60%, 70%, and 80%.

The thickness of sealant layer 12 is selected to provide sufficient material to effect a strong heat seal bond, yet not so thick so as to negatively affect the ovenable characteristics of the film to an unacceptable level. The sealant layer may have a thickness of at least about any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The sealant layer may have a thickness less than about any of the following values: 5 mils, 4 mils, 3 mils, 2 mils, 1 mil, 0.7 mils, 0.5 mils, and 0.3 mils. The thickness of the sealant layer as a percentage of the total thickness of the film may be less than about any of the following values: 50%, 40%, 30%, 25%, 20%, 15%, 10%, and 5%; and may range between any of the forgoing values (e.g., from about 10% to about 30%).

Second Layer of the Film

The second layer 14 may comprise one or more polyamides such as any of those discussed above in any of the following amounts based on the weight of the second layer: at least about 70%, at least about 80%, at least about 90%, at least about 95%, at least about 96%, and at least about 98%. Further, the second layer may comprise about 100% polyamide, may consist of one or more polyamides, or may consist essentially of one or more polyamides.

The second layer may comprise more than one polyamide such as a blend of polyamides, for example, two polyamides, at least two polyamides, three polyamides, and at least three polyamides. The second layer may comprise a first polyamide of at least about, and between about, any of the following amounts (based on the weight of the second layer): 60%, 70%, 80%, and 90%. The second layer may comprise a second polyamide of less than about, and between about, any of the following amounts (based on the weight of the second layer): 50%, 40%, 30%, 20%, and 10%.

Each of the first and second polyamides of the second layer may be selected from, for example, nylon-6, nylon-6,6, nylon-6/6,6, nylon-6,10, nylon-6,12, nylon-6,6/6,10, nylon-6/6,T, nylon-MXD,6, and nylon-4,6. The second layer may comprise any of nylon-6, nylon-6,6, and nylon-6/6,6, and combinations thereof, such as both nylon-6 and nylon-6,6.

The second layer may comprise one or more amorphous polyamides, for example, nylon-6,I/6,T. The second layer may comprise amorphous polyamide in an amount at least about, at most about, and ranging between about any of the following values (based on the weight of the second layer): 10%, 20%, 30%, 40%, 50%, 60%, 70%, and 80%.

To enhance the high-temperature performance of the film, the second layer 14 may have a melting point of at least about any of the following values: 210° C., 220° C., 230° C., 240° C., 250° C., 260° C., 270° C., 280° C., 290° C., and 300° C.; and may range between any of these forgoing values.

The glass transition temperature for the second layer may be less than about, and may range between, any of the following values: 125° C., 120° C., 110° C., 100° C., 90° C., 80° C., 70° C., 60° C., and 50° C.; measured where the relative humidity may be any of the following values: 100%, 75%, 50%, 25%, and 0%.

The second layer may have a melting point greater than the melting point of the sealant layer by at least about any of the following values: 20° C., 30° C., 40° C., 50° C., 60° C., 70° C., 80° C., 90° C., and 100° C.

The second layer may comprise a polyamide blend comprising two or more relatively high-melting point polyamides, such as those discussed above with respect to the sealant layer.

The amount of relatively high-melting point polyamide in the polyamide blend of the second layer may be at least about, and may range between, any of the following amounts (based on the weight of the blend): 70%, 80%, 90%, 95%, 100%.

The thickness of second layer 14 may be selected to provide sufficient material to enhance the ovenable characteristics of the film. The second layer may have a thickness of at least about any of the following values: 0.5 mils, 0.75 mils, 1 mil, 2 mils, 3 mils, 4 mils. The second layer may have a thickness less than about any of the following values: 10 mils, 6 mils, 5 mils, 4 mils, and 3 mils. The thickness of the second layer as a percentage of the total thickness of the film may be at least about any of the following values: 40%, 50%, 60%, 70%, 80%, and 90%; and may range between any of the forgoing values (e.g., from about 40% to about 90%).

Other Layers of the Film

The film of the present invention may include one or more additional layers 22, 24. The additional layers may comprise any of the materials, and in any of the amounts, discussed above with respect to the first and second layers.

The additional layers 22, 24 may comprise one or more barrier components. Useful barrier components include: ethylene/vinyl alcohol copolymer ("EVOH"), polyacrylonitrile ("PAN"), and polyamide, for example, nylon-MXD,6 (either with or without nanocomposite), nylon-MXD,6/MXD,I.

EVOH may have an ethylene content of, for example, between about 20% and 45%, between about 25% and 35%, and 32% by weight. EVOH may include saponified or hydrolyzed ethylene/vinyl acetate copolymers, such as those having a degree of hydrolysis of at least 50%, preferably of at least 85%. EVOH may be a retortable grade EVOH, such as those available from Nippon Goshei.

The additional layer comprising a barrier component may have a thickness and composition sufficient to impart to the film incorporating the barrier layer an oxygen transmission rate of no more than about any of the following values: 150, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985.

An additional layer may comprise barrier component in an amount of at least about any of the following: 50%, 60%, 70%, 80%, 90%, and 100%, based on the weight of the additional layer comprising the barrier component. The thickness of an additional layer may be any of the following: from about 0.05 to about 6 mils, from about 0.05 to about 4 mils, from about 0.1 to about 3 mils, and from about 0.12 to 2 mils.

Additives

Either or both of the layers 12 and 14— or any of the polyamide resins or blends—may comprise effective amounts of one or more nucleating agents. Effective amounts and types of nucleating agents are known to those of skill in the art.

Either or both of the layers 12 and 14— or any of the polyamide resins or blends—may comprise effective amounts of one or more nanocomposite clay materials. Effective amounts and types of nanocomposite agents are known to those of skill in the art.

Either or both of the layers 12 and 14— or any of the polyamide resins or blends—may comprise effective amounts of one or more heat stabilizers. Effective amounts and types of heat stabilizers are known to those of skill in the art, and include, for example, those available under the the Solutia NA-189 trademark and the Honeywell MB-HS trademark. The layer may comprise at least about any of the following amounts of heat stabilizer: 0.2%, 0.5%, 0.8%, 1%, 1.3%, 1.5%, 2%, 2.5%, 3%, 4%, and 5%, and may range between any of those values (e.g., from about 0.5% to about 3%).

One of more of the layers 12, 14, 22, 24 may include one or more additives useful in packaging films, such as, antiblocking agents, slip agents, antifog agents, colorants, pigments, dyes, flavorants, antimicrobial agents, meat preservatives, antioxidants, fillers, radiation stabilizers, and antistatic agents. Such additives, and their effective amounts, are known in the art.

The Film

The film 10, 20, 30, 40 may be capable of forming heat seals under "polyolefin-type" heat seal conditions where the heat seals have a seal strength that can withstand the expected conditions of use in microwave and conventional ovens. To determine whether a film has such a capability, for example, a water-containing package is formed by providing two 4 inch by 6 inch sheets of the film. The sheets are placed in superimposed, coextensive arrangement having the first layers of the films in contact with each other. Three perimeter sides of the sheets are heat sealed together using a ⅛-inch wide sealing bar at a specified temperature selected from 290° F. and 300° F., a dwell time of 0.5 seconds, and a sealing pressure of 40 psig to form an open pouch having heat seals along three of the four perimeter sides. The pouch is filled with 100 milliliters of distilled water at a temperature of 73° F. The fourth perimeter sides of the sheets are heat sealed together under the same conditions as used to seal the three perimeter sides. The resulting closed pouch has a heat seal along the fourth perimeter side and contains the water.

The closed, water-containing pouch is exposed to an amount of time selected from three or four hours in a conventional oven at 400° F. (air temperature ). After removal from the oven and cooling to room temperature, representative samples are cut from the pouch to measure the seal strength of the heat seals. The resulting seal strength of the heat seals may be at least about any of the following values: 1, 1.5, 2, 2.5, 3, 3.5, 4, 4.5, 5, 6, and 10 pounds/inch. The term "seal strength of a heat seal" (or similar terms) as used herein means the maximum amount of force (pounds/inch) required to separate or delaminate two films that have been heat sealed together, as measured in accordance with ASTM F88-94 where the Instron tensile tester crosshead speed is 5 inches per minute, using five, 1-inch wide, representative samples.

Haze is a measurement of the transmitted light scattered more than 2.5° from the axis of the incident light. Haze is measured against the outside surface 16 or 18 of the film (FIGS. 1 to 4), according to the method of ASTM D 1003, which is incorporated herein in its entirety by reference. All references to "haze" values in this application are by this standard. The haze of the film may be no more than about any of the following values: 20%, 15%, 10%, 9%, 8%, 7%, 6%, 5%, 4%, 3%, and 1%. The film may have any of these haze values after a representative sample of the film is placed for two hours in a conventional oven having an air temperature of 400° F.

The film of the present invention may be transparent (at least in the non-printed regions) so that the packaged article is visible through the film. "Transparent" as used herein means that the material transmits incident light with negligible scattering and little absorption, enabling objects (e.g., packaged food or print) to be seen clearly through the material under typical unaided viewing conditions (i.e., the expected use conditions of the material). The transparency (i.e., clarity) of the film may be at least about any of the following values: 20%, 25%, 30%, 40%, 50%, 65%, 70%, 75%, 80%, 85%, and 95%, as measured in accordance with ASTM D1746. All references to "transparency" values in this application are by this standard.

The transparency and the haze of the film may be measured before and after the film has been formed into a closed, water-containing pouch, as discussed above, and after the package has been exposed in a conventional oven at 400° F. (air temperature ) for an amount of time selected from 3 hours and 4 hours. After removal from the oven and cooling to room temperature, representative samples may be taken from the pouch. The transparency and haze of the film before and after this exposure may remain substantially the same—for example, the transparency may not have decreased by more than 5% points (e.g., from a 95% transparency to a 90% transparency) and the haze may not have increased by more than 5% points (e.g., from 10% haze to 15% haze).

The film of the present invention may comprise one or more polyamides in an amount of any of the following ranges based on the weight of the film: at least about 70%, at least about 80%, at least about 90%, at least about 95%, at least about 96%, and at least about 98%. Further, the film may comprise about 100% polyamide, may consist of one or more polyamides, or may consist essentially of one or more polyamides.

The film of the present invention may comprise less than about any of the following amounts of polyolefin (based on the weight of the film): 20%, 15%, 10%, 5%, 3%, 2%, and 1%; and the amount of polyolefin in the film may range between any two of these values (e.g., from about 2% to about 15%). The film may be substantially free of polyolefin.

The film of the present invention may comprise less than about any of the following amounts of polyester (based on the weight of the film): 20%, 15%, 10%, 5%, 3%, 2%, and 1%; and the amount of polyester in the film may range between any two of these values (e.g., from about 2% to about 15%). The film may be substantially free of polyester.

The film of the present invention may have a heat-shrinkable attribute. For example, the film may have a free shrink in at least one direction (i.e., machine or transverse direction), in at least each of two directions (machine and transverse directions), or a total free shrink measured at 220° F. of at least about any of the following: 3%, 7%, 10%, 15%, 20%, 25%, 30%, 40%, 50%, 55%, 60%, and 65%. Further, the film may have any of a free shrink in at least one direction (machine or transverse direction), in at least each of two directions (machine and transverse directions), or a total free shrink of at least about any of these listed shrink values when measured at any of 100° F., 120° F., 140° F., 160° F., 185° F., 190° F., 200° F., and 210° F.

As is known in the art, the total free shrink is determined by summing the percent free shrink in the machine (longitudinal) direction with the percentage of free shrink in the transverse direction. For example, a film which exhibits 50% free shrink in the transverse direction and 40% free shrink in the machine direction has a total free shrink of 90%. Although preferred, it is not required that the film have shrinkage in both directions. Unless otherwise indicated, each reference to free shrink in this application means a free shrink determined by measuring the percent dimensional change in a 10 cm×10 cm specimen when subjected to selected heat (i.e., at a certain temperature exposure) according to ASTM D 2732.

Manufacture of the Film

The film of the present invention may be manufactured by thermoplastic film-forming processes known in the art (e.g., tubular or blown-film extrusion, coextrusion, extrusion coating, flat or cast film extrusion). A combination of these processes may also be employed.

The film may be oriented or non-oriented. The film may be oriented in either the machine (i.e., longitudinal) or the transverse direction, or in both directions (i.e., biaxially oriented), for example, in order to enhance the optics, strength, and durability of the film. For example, the film may be oriented in one of the machine or transverse directions or in both of these directions by at least about any of the following ratios: 2:1, 2.5:1, 2.7:1, 3:1, 3.5:1, and 4:1. The film may be oriented in one of the machine or transverse directions or in both of these directions by no more than about any of the following ratios: 10:1, 9:1, 8:1, 7:1, 6:1, 5:1, and 4:1. If the film is oriented, then it may be heat set or annealed after orientation to reduce the heat shrink attribute to a desired level or to help obtain a desired crystalline state of the film.

Use of the Film

The film may be used in packaging an article or object, for example, packaging food, where the food packaging may be exposed to microwave or conventional oven conditions or both (i.e., dual ovenable) to heat or cook the food. Such food may comprise for example, fresh, raw, partially-cooked, or cooked food, such as red meat products (e.g., beef, veal, lamb, and pork), poultry, and pre-prepared products such as pizza and pasta.

To form the packaged article, the film of the present invention may be heat sealed to either another film or to itself (for example, by a fin seal and/or a lap seal arrangement) to form an open package such as a bag, pouch (e.g., vertical or horizontal form-fill-sealed pouch), tube, or other containment configuration in which the article to be packaged is placed before the package is sealed closed.

Figure 6:
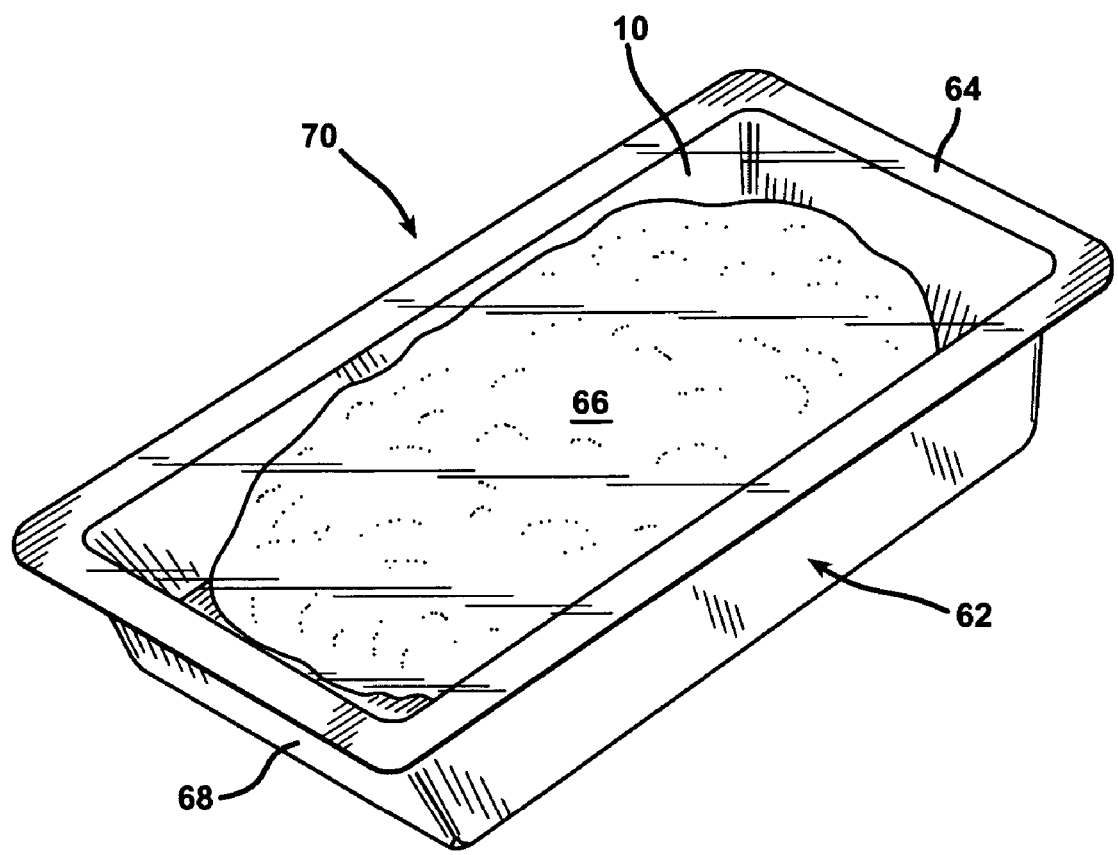
FIG. 6 is a perspective view of a container comprising the film of the present invention.

The film 10 (or any of the films of the present invention) may be heat sealed to a support member 62 (FIG. 6), such as a thermoformed tray having a central depressed area 68 and a surrounding peripheral flange 64. The food product 66 may first be placed on the tray. The film 10 may then be positioned over the food and heat sealed to the peripheral flange 64 of the tray to hermetically enclose the food product and form container 70 enclosing food 66. In such arrangement, the film 10 is the "lid" or "lidstock" and the tray 62 is a "support member."

Heat sealing may occur by one or more of thermal conductance heat sealing, impulse sealing, ultrasonic sealing, and dielectric sealing.

Any of the above-described food may be enclosed in a package comprising the film of the present invention, e.g., a pouch made of the film, as described above. The food may then be heated, reheated, or cooked by placing the food enclosed in the package in an oven and activating the oven to heat or cook the food enclosed in the package to a desired level.

The following examples are presented for the purpose of further illustrating and explaining some embodiments of the present invention and are not to be taken as limiting in any regard. Unless otherwise indicated, all parts and percentages are by weight.

In the following examples these abbreviations may be used:

"PA1-6" is a nylon-6 having a melting point of 220° C. available from BASF Corporation (Parsippany, N.J.) under the Ultramid B4 trademark.

"PA2-6 and -6,6" is a blend of nylon-6 and nylon-6,6 believed to include about 50 to 55 weight % nylon-6 and about 45 to 50 weight % nylon-6,6 available from Honeywell Corporation under the Capron 2120 FN trademark.

"PA3-6" is a nylon-6 having a melting point of 220° C. available from Honeywell Corporation under the Capron B205 trademark.

"PA 1-6N" is a nylon-6 with 1% nucleating agent having a melting point of 220° C. available from BASF Corporation (Parsippany, N.J.) under the Ultramid KR4418 trademark.

"PA1-6,6" is a nylon-6,6 having a melting point of 264° C. available from Solutia Corporation (Pensacola, Fla.) and supplied by Prime Alliance (Des Moines, Iowa) under the ASCEND 66J trademark.

"PA2-6,6" is a nylon-6,6 having a melting point of 264° C. available from BASF Corporation under the Ultramid A4 trademark.

"PA1-6/12" is a nylon-6/12 having a melting point of 130° C. available from EMS Corporation (Sumter, S.C.) under the Grilon CF6S trademark.

"PA1-6,6/6" is a nylon-6,6/6 copolymer having a melting point of 217° C. available from Solutia Corporation (Pensacola, Fla.) and supplied by Prime Alliance (Des Moines, Iowa) under the Ascend 76HF trademark.

"PA1-6,6/6,10" is a nylon-6,6/6,10 having a melting point of 200° C. available from EMS Corporation (Sumter, S.C.) under the Grilon BM 20 SBG trademark.

"PA1-6,I/6,T" is an amorphous nylon-6,I/6,T copolymer having a dry glass transition temperature of 125° C. available from Dupont Corporation (Wilmington, Del.) under the Selar 2072 trademark.

"PA1-MXD,6" is a nylon-MXD,6 having a melting point of 243° C. available from Mitsubishi Corporation under the Nylon MXD6-6007 tradename.

"PA2-MXD,6" is a nylon-MXD,6 including nanocomposite available from Nanocor Corporation (Arlington Heights, Ill.) under the Imperm N37 tradename.

"HS" is a heat stabilizer masterbatch available from Solutia Corporation (Pensacola, Fla.) and supplied by Prime Alliance (Des Moines, Iowa) under the NA-189 trade name.

"EVOH" is a retortable grade ethylene/vinyl alcohol having a melting point of 183° C. and an ethylene content of 32 mole % available from Nippon Goshei (via Soarus of Arlington Heights, Ill.) under the tradename Soarnol SG372B.

EXAMPLES 1-10

The examples 1-10 shown in Table 1 below were made by a cast film extrusion process.

TABLE 1

| | Layer | Thickness (mil) | PA1-6 | PA2-6 and -6,6 | PA1-6,6 | PA1-6/12 | PA1-6,6/6,10 | PA1-6,6/6 | PA1-6,I/6,T | EVOH |
|---|---|---|---|---|---|---|---|---|---|---|
| Ex 1 | 1st | 0.25 | | | 80% | 20% | | | | |
| | 2nd | 0.875 | | 100% | | | | | | |
| | 3rd | 0.875 | | 100% | | | | | | |
| Ex 2 | 1st | 0.25 | | | 40% | 60% | | | | |
| | 2nd | 0.875 | | 100% | | | | | | |
| | 3rd | 0.875 | | 100% | | | | | | |
| Ex 3 | 1st | 0.25 | | | 20% | 80% | | | | |
| | 2nd | 0.875 | | 100% | | | | | | |
| | 3rd | 0.875 | | 100% | | | | | | |
| Ex 4 | 1st | 0.25 | 25% | | | | 75% | | | |
| | 2nd | 1.75 | | | | | | 100% | | |
| Ex 5 | 1st | 0.25 | 30% | | | | | | 70% | |
| | 2nd | 1.75 | | | | | | 100% | | |
| Ex 6 | 1st | 0.25 | 25% | | | | 75% | | | |
| | 2nd | 1.75 | | 40% | 60% | | | | | |
| Ex 7 | 1st | 0.25 | 30% | | | | | | 70% | |
| | 2nd | 1.75 | | 40% | 60% | | | | | |
| Ex 8 | 1st | 0.25 | 25% | | | | 75% | | | |
| | 2nd | 0.875 | | | | | | 100% | | |
| | 3rd | 0.875 | | 40% | 60% | | | | | |
| Ex 9 | 1st | 0.25 | 25% | | | | 75% | | | |
| | 2nd | 0.875 | | | | | | | | 100% |
| | 3rd | 0.875 | | 40% | 60% | | | | | |
| Ex 10 | 1st | 0.25 | 25% | | | | 75% | | | |
| | 2nd | 0.875 | | | | | | | | 100% |
| | 3rd | 0.875 | | | | | 100% | | | |

EXAMPLES 11-20

The Examples 11-24 shown in Table 2 below were made by a blown film extrusion process.

TABLE 2

| | Layer | Thickness (mil) | PA1-6 (wt %) | PA3-6 (%) | PA1-6N (%) | PA1-6,6 (%) | PA2-6,6 (%) | PA1-6,6/6,10 (%) | PA1-6,I/6,T (%) | PA1-MXD,6 (%) | PA2-MXD,6 (%) | HS (%) | EVOH (%) |
|---|---|---|---|---|---|---|---|---|---|---|---|---|---|
| Ex 11 | 1st | 0.25 | 24 | | | | | 75 | | | | 1 | |
| | 2nd | 1.5 | 40 | | | 60 | | | | | | | |
| | 3rd | 0.25 | 24 | | | | | 75 | | | | 1 | |
| Ex 12 | 1st | 0.25 | 30 | | | | | | 69 | | | 1 | |
| | 2nd | 0.875 | 40 | | | 60 | | | | | | | |
| | 3rd | 0.875 | 30 | | | | | | 69 | | | 1 | |
| Ex 13 | 1st | 0.56 | 20 | | | | | 59 | 20 | | | 1 | |
| | 2nd | 1.41 | 70 | | | 30 | | | | | | | |
| Ex 14 | 1st | 0.56 | | | 20 | | | 59 | 20 | | | 1 | |
| | 2nd | 1.41 | | | 40 | 60 | | | | | | | |
| Ex 15 | 1st | 0.47 | 20 | | | | | 59 | 20 | | | 1 | |
| | 2nd | 1.43 | | 40 | | 60 | | | | | | | |
| Ex 16 | 1st | 0.62 | 20 | | | | | 59 | 20 | | | 1 | |
| | 2nd | 0.45 | 69.3 | | | 30 | | | | | | 0.7 | |
| | 3rd | 0.29 | | | | | | | | | 60 | | 100 |
| | 4th | 0.72 | 69.3 | | | 30 | | | | | | 0.7 | |
| Ex 17 | 1st | 0.50 | 20 | | | | | 59 | 20 | | | 1 | |
| | 2nd | 1.40 | 40 | | | | 60 | | | | | | |
| Ex 18 | 1st | 0.40 | 20 | | | | | 59 | 20 | | | 1 | |
| | 2nd | 0.50 | 39.6 | | | 60 | | | | | | 0.4 | |
| | 3rd | 0.35 | | | | | | | | 65 100 | | | |
| | 4th | 0.50 | 39.6 | | | 60 | | | | | | 0.4 | |

TABLE 2-continued

| | Layer | Thickness (mil) | PA1-6 (wt %) | PA3-6 (%) | PA1-6N (%) | PA1-6,6 (%) | PA2-6,6 (%) | PA1-6, 6/6, 10 (%) | PA1-6, I/6, T (%) | PA1-MXD, 6 (%) | PA2-MXD, 6 (%) | HS (%) | EVOH (%) |
|---|---|---|---|---|---|---|---|---|---|---|---|---|---|
| Ex 19 | 1st | 0.50 | 20 | | | | | 59 | 20 | | | 1 | |
| | 2nd | 0.50 | 39.6 | | | 60 | | | | | | 0.4 | |
| | 3rd | 0.25 | | | | | | | | | | | 100 |
| | 4th | 0.50 | 39.6 | | | 60 | | | | | | 0.4 | |
| Ex 20 | 1st | 0.50 | 20 | | | | | 59 | 20 | | | 1 | |
| | 2nd | 0.50 | 39.6 | | | 60 | | | | | | 0.4 | |
| | 3rd | 0.50 | | | | | | | | 100 | | | |
| | 4th | 0.50 | 39.6 | | | 60 | | | | | | 0.4 | |
| Ex 21 | 1st | 0.5 | 20 | | | | | 59 | 20 | | | 1 | |
| | 2nd | 1.5 | 39 | | | 60 | | | | | | 1 | |
| Ex 22 | 1st | 0.58 | 20 | | | | | 59 | 20 | | | 1 | |
| | 2nd | 0.53 | 39.6 | | | 60 | | | | | | 0.4 | |
| | 3rd | 0.27 | | | | | | | | 100 | | | |
| | 4th | 0.98 | 39.6 | | | 60 | | | | | | 0.4 | |
| Ex 23 | 1st | 0.5 | 24 | | | | 75 | | | | | 1 | |
| | 2nd | 1.5 | 40 | | 60 | | | | | | | | |
| Ex 24 | 1st | 0.5 | 20 | | | | | 59 | 20 | | | 1 | |
| | 2nd | 1.5 | 69.3 | | | 30 | | | | | | 0.7 | |

The Example 16 film had a haze of 11.6%, a transmittance of 93.6%, and a clarity of 29.08%. The Example 23 film had a haze of 26.03%, a transmittance of 93.8%, and a clarity of 1.00%. The Example 24 film had a haze of 13.65%, a transmittance of 93.6%, and a clarity of 35.43%. Transmittance is measured according to the method of ASTM D 1003. All references to "transmittance" values in this application are by this standard.

A heat seal was formed (or was attempted to be formed) for each of the following films shown in Table 3 by placing the heat seal layer of a sheet of the subject film in contact with the heat seal layer of another sheet of the same film. The superimposed sheets were exposed to 80 psig sealing pressure for a 1 second dwell time using a Sencorp Model 12ALS/1 sealer at the seal bar temperature shown below. The strength of the resulting heat seal is shown in Table 3.

TABLE 3

| Seal Bar Temp (° F.) | Example 21 Seal Strength (lbf/in) | Example 19 Seal Strength (lbf/in) |
|---|---|---|
| 266 | 0.298 | 0.367 |
| 284 | 2.52 | 7.49 |
| 302 | 6.83 | 9.4 |
| 320 | 6.2 | 8.47 |

A heat seal was formed (or was attempted to be formed) for each of the following films shown in Table 4 by placing the heat seal layer of a sheet of the subject film in contact with the heat seal layer of another sheet of the same film. The superimposed sheets were exposed to 40 psig sealing pressure for a 0.5 second dwell time using a Sencorp Model 12ALS/1 sealer at the seal bar temperature shown below. The strength of the resulting heat seal is shown in Table 4. Comp 1 (comparative 1) is a 1.2 mil mono-layer nylon film commercially available from Gem Polymer Corporation as Crystal 33. Comp 2 (comparative 2) is a 0.79 mil mono-layer film of nylon -6 and nylon-6,6 blend commercially available from Reynolds Corporation under the Reynolds Oven Bag trade name.

TABLE 4

| Seal Bar Temp (° F.) | Example 21 Seal Strength (lbf/in) | Example 19 Seal Strength (lbf/in) | Example 13 Seal Strength (lbf/in) | Comp 1 Seal Strength (lbf/in) | Comp 2 Seal Strength (lbf/in) |
|---|---|---|---|---|---|
| 257 | 0.135 | 0.128 | 0.152 | | |
| 266 | 0.227 | 0.207 | 0.264 | | |
| 275 | 0.447 | 0.654 | 3.14 | | |
| 284 | 2.66 | 2.16 | 5.15 | | |
| 293 | 5.24 | 4.9 | 6.47 | | |
| 302 | 7.23 | 7.39 | 7.17 | | |
| 320 | 6.93 | 7.25 | 8.03 | | |
| 338 | 8.78 | 9.61 | 9.41 | 0.439 | 0.0754 |
| 356 | | | | 2.38 | 0.0549 |
| 374 | | | | 4.1 | 0.131 |
| 392 | | | | | 2.15 |

(A blank cell indicates that a measurement was not taken.)

Cooking Example

The film of Example 16 was used to form three 12 inch by 18 inch pouches each having three edges heat sealed together using an impulse sealer to seal the edge areas of the first layers of the superimposed sheets together. Raw meat was placed into each pouch through its open fourth edge. A 0.5 pound pork tenderloin was placed into the first pouch; and a three pound chicken was placed into each of the second and third pouches. The fourth edge of each pouch was then vacuum heat sealed using a Koch vacuum sealing machine to form three closed packages enclosing the meat.

The first closed pouch was then placed in a microwave oven and cooked on high power for 5 minutes. The first pouch puffed up during cooking. The second closed pouch was placed in the microwave oven and cooked on high power for 20 minutes. The second pouch puffed up during the cooking process and the chicken enclosed in the second pouch became fully cooked and browned on top. The Example 16 film from which the first and second pouches were formed remained clear and flexible. The integrity of the heat seals of each of the first and second pouches were maintained during the microwave oven cooking exposure.

The third closed pouch was placed in a convection oven set at 177° C. (350° F.) for 2 hours. The third pouch puffed up during the cooking process and the chicken became fully cooked and browned on top. The Example 16 film from which the third pouch was formed remained clear and flexible. The integrity of the heat seals of the third closed pouch were maintained during the convection oven cooking exposure.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. All references to ASTM tests are to the most recent, currently approved, and published version of the ASTM test identified, as of the priority filing date of this application. Each such published ASTM test method is incorporated herein in its entirety by this reference.

What is claimed is:

1. A film comprising:
    a first layer comprising:
        a first polyamide selected from polyamide having a melting point of less than about 210° C. and amorphous polyamide; and
        a second polyamide selected from polyamide having a melting point of less than 210° C. and amorphous polyamide;
    a second layer comprising one or more polyamides, wherein:
        the second layer has a melting point of at least about 210° C.;
        the film has first and second opposite outer surfaces;
        the first layer forms the first outer surface of the film; and
        the film is substantially free of polyolefin.

2. The film of claim 1 wherein:
    the first polyamide comprises polyamide having a melting point of less than about 210° C.; and
    the second polyamide comprises amorphous polyamide.

3. The film of claim 1 wherein the first and second polyamides each have melting points of less than about 210° C.

4. The film of claim 1 wherein:
    the first polyamide is selected from nylon-6/6,6, nylon-6,6,/6,10, nylon-6/9, nylon-6/12, nylon-12, nylon-12,T, nylon-6/6,9, nylon-11, and nylon 6,I/6,T; and
    the second polyamide is selected from nylon-6/6,6, nylon-6,6,/6,10, nylon-6/9, nylon-6/12, nylon-12, nylon-12,T, nylon-6/6,9, nylon-11, and nylon 6,I/6,T.

5. The film of claim 1 wherein the first layer comprises at least about 40 weight % of the first polyamide, based on the weight of the first layer.

6. The film of claim 1 wherein the first polyamide is nylon-6/6,6.

7. The film of claim 1 wherein:
    the first layer comprises at least about 40 weight % of the first polyamide, based on the weight of the first layer; and
    the first polyamide is nylon-6/6,6.

8. The film of claim 1 wherein the first polyamide is nylon-6/6,6 and the second polyamide is nylon-6,I/6,T.

9. The film of claim 1 wherein the first polyamide is nylon-6,6,/6,10.

10. The film of claim 1 wherein the first layer comprises less than about 60 weight %, based on the weight of the first layer, of the second polyamide.

11. The film of claim 1 wherein the first polyamide is nylon-6/6,6 and the second polyamide is nylon-6,6,/6,10.

12. The film of claim 1 wherein the first polyamide is nylon-6/6,6 and the second polyamide is nylon-6,6,/6,10 comprising from about 10 mole % to about 60 mole % hexamethylene adipamide polymer units.

13. The film of claim 1 wherein the first polyamide is nylon-6/6,6 and the second polyamide selected from nylon-6/9, nylon-6/12, nylon-12, nylon-12,T, nylon-6/6,9, and nylon-11.

14. The film of claim 1 wherein the first layer has a melting point of less than about 210° C.

15. The film of claim 1 wherein the first layer has a melting point of less than about 200° C.

16. The film of claim 1 wherein the first layer has a melting point of less than about 190° C.

17. The film of claim 1 wherein the second layer forms the second outer surface of the film.

18. The film of claim 1 wherein the first layer comprises less than about 50% of the total thickness of the film.

19. The film of claim 1 wherein the first layer comprises less than about 40% of the total thickness of the film.

20. The film of claim 1 wherein the first layer comprises less than about 30% of the total thickness of the film.

21. The film of claim 1 wherein the second layer comprises at least about 40% of the total thickness of the film.

22. The film of claim 1 wherein the second layer comprises at least about 50% of the total thickness of the film.

23. The film of claim 1 wherein the second layer comprises one or more polyamides selected from selected from nylon-6, nylon-6,6, and nylon-6/6,6.

24. The film of claim 1 wherein the second layer comprises one or more polyamides selected from nylon-6,10, nylon-6,12, nylon-6/6,T, nylon-MXD,6, nylon-4,6, nylon-6,9, and nylon-6,6/6,10.

25. The film of claim 1 wherein the second outer layer comprises amorphous polyamide.

26. The film of claim 1 wherein the film is substantially free of polyester.

27. The film of claim 1 wherein the melting point of the second layer is at least about 20° F. greater than the melting point of the first layer.

28. The film of claim 1 wherein the haze of the film after two hours of exposure to air temperature of 400° F. in a conventional oven is less than about 20%.

29. A packaged food comprising:
    a food; and
    a package enclosing the food, wherein the package comprises the film of claim 1.

30. The film of claim 1 wherein the film comprises a third layer comprising ethylene/vinyl alcohol copolymer.

31. The film of claim 1 wherein the film has an oxygen transmission rate of no more than about 150 cubic centimeters (at standard temperature and pressure) per square meter per day per 1 atmosphere of oxygen pressure differential measured at 0% relative humidity and 23° C.

32. A method of heating a food comprising:
    providing a food enclosed in a package comprising the film of claim 1;
    placing the food enclosed in the package in an oven; and
    activating the oven to heat the food enclosed in the package to a desired level.

33. The film of claim 1 wherein:
the first layer comprises at least about 40 weight % of the first polyamide, based on the weight of the first layer; and
the first polyamide is nylon-6,6,/6,10.

34. The film of claim 33 wherein the nylon-6,6,/6,10 comprises from about 10 mole % to about 60 mole % hexamethylene adipamide polymer units.

35. The film of claim 33 wherein the second polyamide is nylon-6,I/6,T.

36. The film of claim 1 wherein the first layer comprises at least about 40 weight % of the first polyamide and less than about 60 weight % of the second polyamide, based on the weight of the first layer.

37. The film of claim 36 wherein the first polyamide is nylon-6/6,6.

38. The film of claim 36 wherein:
the first polyamide is selected from nylon-6/6,6 and nylon-6,6,/6,10; and
the second polyamide is selected from nylon-6/6,6, nylon-6,6,/6,10, nylon-6/9, nylon-6/12, nylon-12, nylon-12,T, nylon-6/6,9, nylon-11, and nylon 6,I/6,T.

39. The film of claim 1 wherein:
the first layer comprises at least about 40 weight % of the first polyamide, based on the weight of the first layer;
the first polyamide is nylon-6/6,6; and
the second polyamide is amorphous.

40. The film of claim 39 wherein the second polyamide is nylon-6,I/6,T.

41. The film of claim 1 wherein the first polyamide is nylon-6/6,6 comprising an amount of hexamethylene adipamide polymer units selected from at least about 60 mole % and less than about 20 mole %.

42. The film of claim 41 wherein the nylon-6/6,6 comprises at least about 70 mole % hexamethylene adipamide polymer units.

43. The film of claim 41 wherein the nylon-6/6,6 comprises at least about 80 mole % hexamethylene adipamide polymer units.

44. The film of claim 41 wherein the nylon-6/6,6 comprises less than about 10 mole % hexamethylene adipamide polymer units.

45. The film of claim 1 wherein:
the first polyamide is selected from nylon-6/6,6 and nylon-6,6,/6,10; and
the first layer comprises at least about 50 weight % of the first polyamide, based on the weight of the first layer.

46. The film of claim 45 wherein the first layer comprises at least about 60 weight % of the first polyamide, based on the weight of the first layer.

47. The film of claim 45 wherein the first layer comprises at least about 5 weight %, based on the weight of the first layer, of the second polyamide.

48. The film of claim 45 wherein the first layer comprises less than about 50 weight %, based on the weight of the first layer, of the second polyamide.

49. The film of claim 45 wherein the first layer comprises less than about 40 weight %, based on the weight of the first layer, of the second polyamide.

50. The film of claim 45 wherein the first layer comprises less than about 30 weight %, based on the weight of the first layer, of the second polyamide.

51. The film of claim 1 wherein the first layer comprises less than about 60 weight %, based on the weight of the first layer, of a third polyamide.

52. The film of claim 51 wherein the first layer comprises at least about 5 weight %, based on the weight of the first layer, of the third polyamide.

53. The film of claim 51 wherein the third polyamide is selected from polyamide having a melting point of less than about 210° C. and amorphous polyamide.

54. The film of claim 51 wherein the third polyamide is amorphous polyamide.

55. The film of claim 51 wherein the third polyamide is selected from nylon-6/9, nylon-6/12, nylon-12, nylon-12,T, nylon-6/6,9, nylon-11, nylon-6,6,/6,10.

56. The film of claim 51 wherein the second polyamide is nylon-6,I/6,T and the third polyamide is nylon-6,6,/6,10.

57. The film of claim 1 wherein the film comprises a third layer comprising amorphous polyamide.

58. The film of claim 57 wherein the third layer forms the second outer surface of the film.

59. The film of claim 57 wherein the third layer is between the first and second layers.

60. The film of claim 59 wherein third layer comprises at least about 50 weight % amorphous polyamide based on the weight of the third layer.

* * * * *